United States Patent [19]

Takenaka et al.

[11] Patent Number: 4,940,083
[45] Date of Patent: Jul. 10, 1990

[54] APPARATUS FOR CONDITIONING AIR FOR A VEHICLE COMPARTMENT

[75] Inventors: Yasushi Takenaka; Takeshi Sugiyama; Shunsuke Kajita, all of Kanagawa, Japan

[73] Assignee: Nissan shatai Company, Limited, Hiratsuka, Japan

[21] Appl. No.: 231,225

[22] Filed: Aug. 11, 1988

Related U.S. Application Data

[63] Continuation of Ser. No. 89,968, Aug. 27, 1987, abandoned.

[30] Foreign Application Priority Data

Aug. 29, 1986 [JP] Japan ................................. 61-203189
Mar. 31, 1987 [JP] Japan ............................. 62-48173[U]

[51] Int. Cl.$^5$ .............................................. B60H 1/02
[52] U.S. Cl. ........................................ 165/42; 165/43; 165/22; 237/12.3 A; 98/2.08; 98/2.09
[58] Field of Search ...................... 165/22, 42, 43, 122, 165/903; 98/2.08, 2.09, 2.11; 237/12.3 R, 12.3 A; 239/123 B

[56] References Cited

U.S. PATENT DOCUMENTS

| | | | |
|---|---|---|---|
| 4,227,569 | 10/1980 | Wattin | 165/42 |
| 4,289,195 | 9/1981 | Bellot et al. | 165/42 |
| 4,385,503 | 5/1983 | Okura | 165/43 |
| 4,456,166 | 6/1984 | Kogohaba | 165/43 |
| 4,482,009 | 11/1984 | Nishimura et al. | 165/43 |
| 4,691,862 | 9/1987 | Muto et al. | 98/208 |

FOREIGN PATENT DOCUMENTS

| | | | |
|---|---|---|---|
| 427141 | 11/1947 | Italy | 165/122 |
| 0051615 | 4/1980 | Japan | 165/43 |
| 0138639 | 10/1981 | Japan | 237/5 |
| 0182509 | 11/1982 | Japan | 98/2.08 |
| 0114106 | 7/1984 | Japan | 237/12.3 B |
| 0008105 | 1/1985 | Japan | 98/2.08 |
| 60-61326 | 4/1985 | Japan | |
| 60-244612 | 12/1985 | Japan | |
| 0001527 | 1/1986 | Japan | 237/5 |
| 0081216 | 4/1986 | Japan | 237/12.3 A |
| 0263822 | 11/1986 | Japan | 237/12.3 A |
| 0282115 | 12/1986 | Japan | 98/2.11 |
| 0001615 | 1/1987 | Japan | 237/12.3 A |

Primary Examiner—John Ford
Attorney, Agent, or Firm—Bachman & LaPointe

[57] ABSTRACT

A structure of an air conditioning apparatus applicable to a vehicle compartment is disclosed. In the air conditioning apparatus, a heater core for heating an introduced air is disposed in a heating unit casing so as to be in parallel to an air stream passage derived from an air cooling unit or inclined through a predetermined air suppression angle with respect to the air stream so that air resistance of the heater core against the air stream is minimized and a higher cooling characteristic can be achieved. In addition, a door member disposed on an upstream end surface of the heater core for mixing cooled and heated air is substantially aligned with an extension line of an air output side surface of the heater core in a maximum cooling mode of operation of the apparatus. Furthermore, a space within the heating unit casing for a main air stream passage derived from the air cooling unit is sufficiently secured so that a dimension of the heating unit can be saved to meet a requirement for mounting the air conditioning apparatus into a predetermined position of a limited space of the vehicle compartment.

11 Claims, 5 Drawing Sheets

APPARATUS FOR CONDITIONING AIR FOR A VEHICLE COMPARTMENT

This is a continuation, of application Ser. No. 089,968 filed Aug. 27, 1987, now abandoned.

BACKGROUND OF THE INVENTION

The present invention relates to an improved apparatus for conditioning air for a vehicle compartment with a higher air cooling capability.

Japanese Patent Application first Publications (Tokkai) sho No. 60-61326 and sho No. 60-244612 exemplify structures of the air conditioning apparatuses.

One of the previously proposed air conditioning apparata disclosed in the above-identified earlier Japanese Patent Application document will be described below.

A passage of air stream is formed in a heating unit casing. The air stream passage is extended from an air intake opening of the heating unit casing to an air blowout opening thereof. In the air stream passage of the air conditioning apparatus, a blower, an evaporator, an air mixing door, and a heater core are disposed sequentially with respect to the direction of the air stream. The heater core serves to partition the air stream passage into two parallel branch passages; a first air stream passage for introducing air to the heater core and a second air stream passage for mixing air. The first air stream passage is defined by a wall of the heating unit casing opposing the heater core and air introducing side of the heater core. The heater core is disposed in the heating unit casing so that a downstream of the second air stream passage is wider in cross sectional area than an upstream thereof. Therefore, the heater core is inclined with respect to the air stream passage.

In addition, the air mixing door is attached to the casing, with a pivotal axle thereof being disposed at a corner between an air introducing side surface of the heater core and upstream side end surface. An opening angle of the air mixing door with respect to the heater core is adjusted to provide temperature adjustment of blowout air of the air conditioning apparatus, changing a mixture ratio of cooled air and warmed air in the blow-out air from the blowout air opening. When the air mixing door completely closes the first air stream passage for the heater core, a maximum cooling state is set. When the air mixing door completely opens the first air stream passage for the heater core, a maximum heating state is set.

However, in general cooling capability of air conditioning apparatuses tends to be inferior to heating capability in air conditioning apparatuses applied to automotive vehicles. This is because the compressor and condensor of the air conditioning apparatus tend to become small-sized due to a limited space for mounting one air conditioning apparatus on the vehicle body and a lower suppressed driving force required to operate the air conditioning apparatus.

Next, the following problems arise in a maximum cooling operation mode of the previously proposed air conditioning apparatus in which a maximum cooling capability thereof is exhibited.

(1) The air mixing door is disposed on a corner between the air introduction side surface of the heater core and the upstream side end surface of the heater core so as to expose the upstream side end surface to the air stream when the air mixing door is completely closed to block the first air stream passage. Thus, an airflow speed in the second air stream passage becomes lowered due to an air resistance of the upstream side end surface of the heater core against the air stream and accordingly air flow quantity supplied to the vehicle compartment becomes reduced. Consequently, the vehicle compartment is not quickly cooled. In addition, noise is generated in the second air stream passage when the air stream passes aside the upstream side end surface of the heater core.

Such a problem is common in any of the air conditioning apparatuses in which the upstream side end surface of the heater core is exposed to the air stream.

(2) Since the heater core is disposed so that the downstream side of the second air stream passage becomes wider, a part in which air stream pressure becomes negative occurs and unfavorable turbulence is generated therein. Consequently, airflow speed becomes slow and accordingly airflow quantity becomes reduced. In addition, undesirable turbulence noise is generated in the maximum cooling operation mode of the air conditioning apparatus.

In the way described above, the cooling characteristic of the air conditioning apparatus becomes reduced. The same problems apply equally well to the air conditioning apparatus disclosed in the above-identified latter Japanese Patent Application document.

SUMMARY OF THE INVENTION

Accordingly, it is an object of the present invention to provide an improved apparatus for conditioning air for a vehicle compartment.

It is another object of the present invention to provide the air conditioning apparatus which can exhibit a favorable maximum cooling characteristic.

It is further object of the present invention to provide the air conditioning apparatus in which a resistance of air heating component disposed in a casing thereof against an air stream in the same casing is minimized especially in the maximum cooling operation.

It is still, another object of the present invention to provide an air conditioning apparatus so as to enable mounting thereof on a limited space of the vehicle compartment with a sufficiently wide passage of air stream in the casing secured.

The above-described objects can be achieved by providing a structure of an air conditioning apparatus, comprising: (a) a casing into which air is introduced and an air stream passage of the introduced air is formed therein, and through which the introduced air is supplied to a limited space; (b) first means for cooling the introduced air of the air stream passage; and (c) second means for heating the introduced air passed through the first means, the second means being disposed downstream of the first means so as to minimize an air resistance thereof against the air stream passage derived from the first means.

The above-described objects can be achieved by providing a structure of an air conditioning apparatus for a vehicle compartment, comprising: (a) a first unit for introducing air from the vehicle compartment or external to the vehicle compartment and generating an air stream of the introduced air; (b) a second unit for cooling the air stream generated by the first unit; and (c) a third unit for heating the cooled air stream by the second unit according to an operation mode of the air conditioning apparatus and outputting the heated air to the vehicle compartment, the third unit having a unit casing, a heater core disposed within the unit casing and inclined through a predetermined angle with respect to a direction of the air stream so as to reduce an air resistance thereof against the air stream, and an air mixing door member disposed upstream of the heater core for operatively adjusting airflow quantity of the air stream supplied to the heater core, the air mixing door member being aligned with an elongated direction of the heater core in a maximum cooling mode of operation of the air conditioning apparatus.

The above-described objects can be achieved by providing a structure for an air conditioning apparatus for a vehicle compartment, comprising: (a) a first unit for introducing air from the vehicle compartment or external to the vehicle compartment and generating an air stream of the introduced air; (b) a second unit for cooling the air stream generated by the first unit; and (c) a third unit for heating the cooled air stream by the second unit according to an operation mode of the air conditioning apparatus and outputting the heated air to the vehicle compartment, the third unit having a unit casing, a heater core in a rectangular shape of cross section disposed within the unit casing and substantially in parallel to the air stream derived from the second unit, main and subsidiary door members disposed upstream of an upstream end surface of the heater core, the main door member for operatively blocking a first auxiliary passage introducing part of the air stream into a first area of a first side surface of the heater core through which air stream of the first passage is introduced into the heater core and blocking a main passage of the air stream derived from the second unit together with the subsidiary door, and an air mixing door member disposed on a second area of the first side surface for operatively blocking the air stream of a second auxiliary passage of the main passage introducing to a second area of the first side surface of the heater core, the second auxiliary passage being linked to a floor air blow outlet via a downstream half portion of the heater core and a space between a downstream end surface of the heater core and a rear wall of the unit casing.

DETAILED DESCRIPTION OF THE PREFERRED EMBODIMENTS

Reference will hereinafter be made to the drawings in order to facilitate understanding of the present invention.

Figure 1:
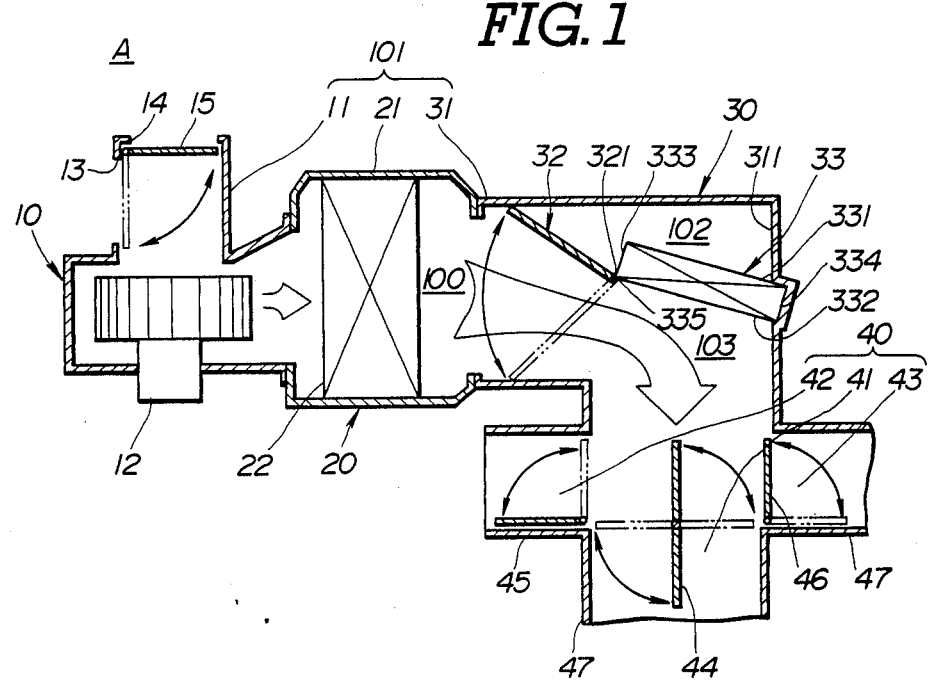
FIG. 1 is a cross sectional view of an air conditioning apparatus applicable to a vehicle compartment in a first preferred embodiment.
Figure 2:
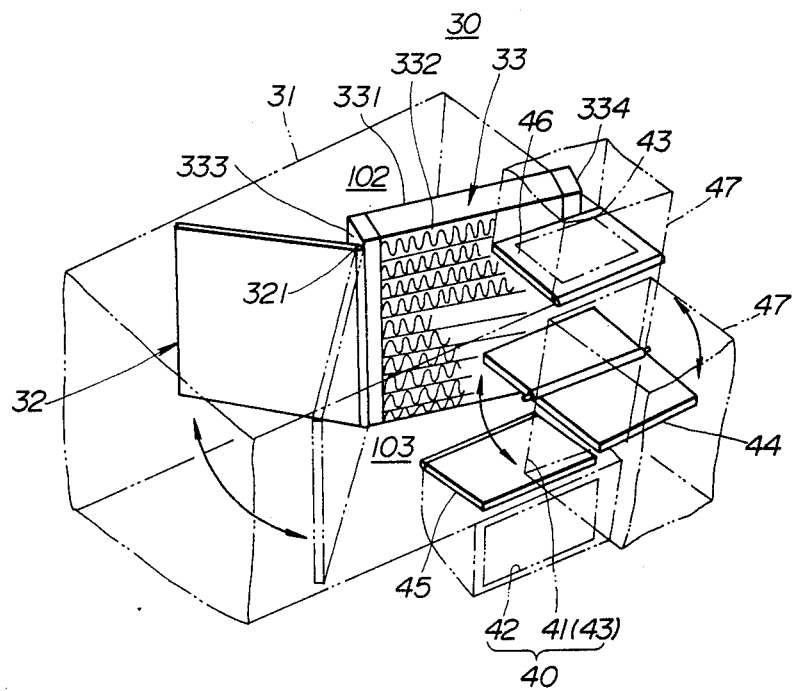
FIG. 2 is a perspective view of an essential part of the air conditioning apparatus shown in FIG. 1.

FIGS. 1 and 2 show a first preferred embodiment of an apparatus for conditioning air applicable to a vehicle compartment according to the present invention.

An air conditioning apparatus denoted by symbol A is usually housed in a predetermined space, e.g., a rear side of an instrument panel of an automotive vehicle. The air conditioning apparatus A is, e.g., divided into an air blowing unit 10, a cooling unit 20, and a heating unit 30.

The blowing unit 10 is formed with a motor 12 disposed within a blowing unit casing 11, the casing 11 having a first opening inlet 13 for introducing circulated air in the vehicle compartment and a second opening inlet 14 for introducing external fresh air, and a switching door 15 for operatively switching the introduction of air between both inlets 13 and 14.

The cooling unit 20 is formed downstream of the motor 12 and preferably integrally formed with the blowing unit 10. The cooling unit 20 is formed to cool air passed thereto. The cooling unit 20 includes a cooling unit casing 21 and an evaporator 22 disposed in the cooling unit casing 21 so as to face the whole air stream from the blowing unit 10.

The heating unit 30 is continuously disposed downstream of the cooling unit 20. The heating unit 30 includes a heating unit casing 31, an air mixing door 32, and heater core 33.

Downstream of the heating unit casing 31, a ventilation air outlet 41 is opened which is orthogonal to the direction of air stream through the motor 12 and is substantially faced against the heating unit 30. A floor blow outlet 42 is opened at a portion below the ventilation outlet 41 as viewed from FIG. 2, and a defrost blow outlet 43 is opened at a portion above the floor blow outlet 42 as viewed from FIG. 2. These ventilation blow outlet 41, floor blow outlet 42, and defrost blow outlet 43 form a air blow outlet 40 of the heating unit 30. A ventilation door 44, floor door 45, and defrost door 46 are disposed for opening or closing the corresponding blow outlets 41, 42, and 43, respectively. Ducts 47 are provided for connecting the ventilation blow outlet 41 and defrost blow outlet 43 to outlets (not shown) disposed within the vehicle compartment.

The above-described air blow outlets 41, 42, and 43 are arranged at left and right sides as viewed from FIG. 1 for explanation conveniences.

An air conditioning casing 101 is formed with the blowing unit casing 11, cooling unit casing 21, and heating unit casing 31 for providing an internal air stream passage 100 from either of the intake air inlets 13, 14 to the air-blow outlet 40 of the heating unit 30.

As shown in FIGS. 1 and 2, the heater core 33 is of a rectangular box shape and is defined by a first side 331 through which air to be heated is introduced, a second side surface 332 through which heated air is outputted, an upstream side end surface 333 disposed upstream of the first and second side surfaces 331 and 332, and a downstream side end surface 334 opposing the upstream side end surface 333 and fixed to a side wall of the heating unit casing 31. It is noted that the heater core 33 is disposed in the heating unit casing 31 with the air stream passage 100 being halved in parallel into a first air stream passage 102 defined by the first side surface 331 and a side wall 311 of the casing 31 and into a second air stream passage 103 defined by the second side surface 332 and side walls of the casing 31. In addition, the second side surface 332 is disposed so as to provide a slight airflow suppression angle with respect to the air stream passage 100. Furthermore, the downstream side end surface 334 of the heater core 33 is contacted with the downstream end wall 311 of the heating unit casing 31 so that the cooled air blown to the first air stream passage 102 is introduced to the heater core 33.

The air mixing door 32 is provided to adjust a ratio of airflow quantity introduced between the first air stream passage 102 and second air stream passage 103, i.e., a mixed percentage of cooled air passed through the evaporator 22 and warmed air passed through the heater core 33 so that air temperature outputted from the blow outlet 40 is adjusted. The air mixing door 32 has the pivotal axle 321 disposed at the corner 335 between the second side surface 332 of the heater core 33 and upstream side end surface 333 thereof. The air mixing door 32 is, as shown in FIG. 1, inclined through an acute angle of substantially 30 degrees with respect to the direction of air stream when the opening angle thereof is adjusted to a maximum cooling position at which the first air stream passage 102 is completely closed. At this time, a door plate (flap), portion of the air mixing door 32 is substantially aligned straightly with the second side surface 332 of the heater core 33 as shown in a solid line of FIG. 1.

It is noted that although the air mixing door 32 is disposed on the corner 335 of the heater core 33 in the first preferred embodiment, the pivotal axle 321 of the air mixing door 32 may be placed on an upstream side extended part of the heater core 33 which is formed with a less air-resistance covering over the upstream side end surface 333 of the heater core 33.

Next, an operation of the first preferred embodiment will be described below.

(Maximum heating)

In a maximum heating operation mode in which the air mixing door 32 is pivoted to fully close the second air stream passage 103 as shown in a phantom line of FIG. 1, the cooled air derived from the cooling unit 20 is introduced to the first air stream passage 102 and heated by means of the heater core 33. The heated air is then blown out in the vehicle compartment via predetermined air blow outlets 41, 42, and 43 of the air blow outlet 40.

(Temperature Adjustment)

In a temperature control mode in which the air mixing door 32 is pivoted to open both the first air stream passage 102 and second stream passage 103, part of the cooled air passed through the cooling unit 20 is heated by the heater core 33 through the first air stream passage 102 and outputted from the second side surface 332 of the heater core 33 to the second air stream passage 103 and the remaining cooled air is introduced from the cooling unit 20 directly to the second air stream passage 103. The rate of the cooled air to the heated air mixed at the second air stream passage 103 is dependent on the opening angle of the mixing door 32.

(Maximum Cooling)

In a maximum cooling operation mode in which the air mixing door 32 is pivoted to close the first air stream passage 102 of the heating unit 30, the cooled air passed through the cooling unit 20 is wholly supplied to the second air stream passage 103 (not to the first air stream passage 102) and blown out in the vehicle compartment, in this mode, via the ventilation blow-out outlet 41.

Since, as shown in FIG. 1, the upstream side end surface 333 of the heater core 33 is covered with the closed air mixing door 32 and receives no air stream, the upstream side end surface 333 does not provide an obstacle as the air flow resistance against the air stream.

In addition, since the inclination of the air mixing door 32 with respect to the direction of air stream is not steep and the air mixing door, 32 and the second side surface 332 take a substantially flat plane form with no step difference, the air resistance against the direction of air stream is negligibly small.

Furthermore, since the second side surface 332 of the heater core 33 is provided with the slight suppression angle with respect to the air stream as described above, the air pressure at a downstream area below the second side surface 332 does not become negative and unfavorable turbulence does not occur thereat.

As described above, in the air conditioning apparatus A for the vehicle compartment in the first preferred embodiment, the air resistance of the air mixing door 32 and heater core 33 against the air stream in the heating unit 30 is small and the second stream passage 103 provides a space in which it is difficult to generate turbulence. The cooling capability of the air conditioning apparatus A therefore is not reduced due to reduced air stream resistance and turbulence.

In addition, since only the single flat type air mixing door 32 is used to adjust the temperature of the blow-out air, the construction of the air conditioning apparatus A is simplified.

Figure 3:
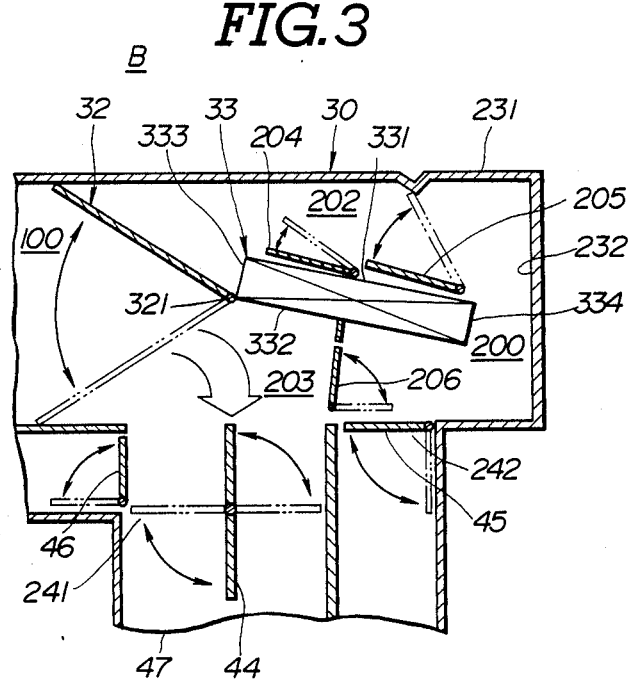
FIG. 3 is a cross sectional view of an essential part of the air conditioning apparatus in a second preferred embodiment.
Figure 4:
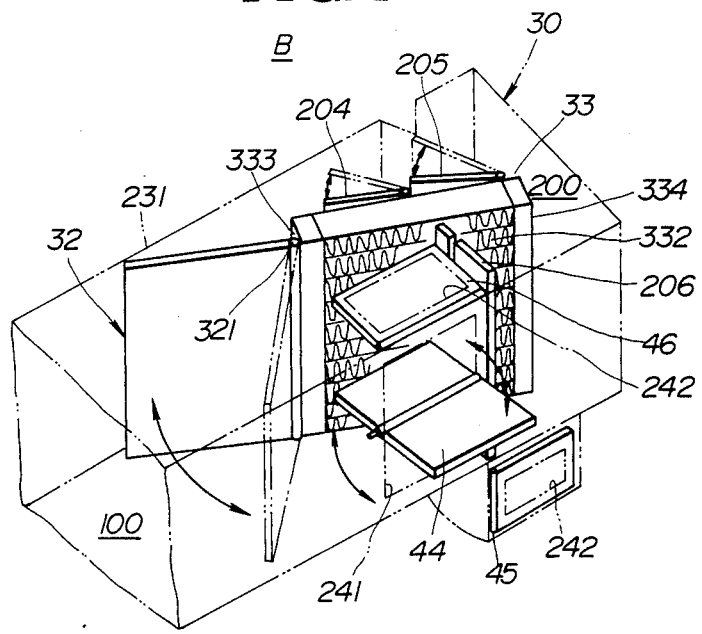
FIG. 4 is a perspective view of an essential part of the air conditioning apparatus in the second preferred embodiment shown in FIG. 3.

Next, the structure of the air conditioning apparatus B in a second preferred embodiment will be described with reference to FIGS. 3 and 4.

In the second preferred embodiment, blow-out air temperatures at the ventilation blow outlet 241 and floor blow outlet 242 can be set to become different from each other.

In details, the heater core 33 is disposed within the heating unit casing 231 with a space 200 provided against a downstream wall surface 232 of the heating unit casing 231.

The floor blow outlet 242 is disposed within the casing 231 so that a horizontal position of the floor air blow outlet 242 is overlapped over a downstream half of the heater core 33. On the other hand, a right-side half of the ventilation air blow outlet 241 is disposed within the casing 231 so as to oppose an upstream half of the heater core 33.

In addition, auxiliary first door 204 and second door 205 are extended in a midway through the first air stream passage 202. The first door 204 adjusts an air introduction quantity toward the heater core 33 (output quantity of air to the ventilation air blow outlet 241) to be supplied to the upstream half of the heater core 33. The second door 205 adjusts an air introduction quantity (output quantity of air to the floor air blow outlet 242) to be supplied to the downstream half of the heater core 33.

In addition, the second air stream passage 203 is provided with a bypass door 206 set so as to enable limiting the introduction of cooled air to the floor air blow outlet 242.

Hence, when opening angles of the first door 204 and second door 205 are adjusted and the bypass door 206 blocks the second air stream passage 203, temperatures at the ventilation air blow outlet 241 and floor air blow outlet 242 are differed (in such a way that the ventilation air blow outlet 241 provides cooled air and floor air blow outlet 242 provides warmed air) and airflow quantities therebetween are adjusted.

In the first and second preferred embodiments, the air conditioning apparatus casing is constituted by each of the unit casings 11, 21, 31, and 231 but may be constituted by an integrally formed casing.

In addition, although in the first and second preferred embodiments, the pivotal axle 321 of the air mixing door 32 is directly disposed on the corner between the upstream side end surface 331 and second side surface 332 of the heater core 33, the position of the pivotal axle 321 may be deviated from the corner provided that the air mixing door can cover the upstream side end surface of the heater core in the maximum cooling operation mode.

Next, the structure of the air conditioning apparatus for the vehicle compartment in a third preferred embodiment will be described with reference to FIGS. 5 to 9.

Figure 5:
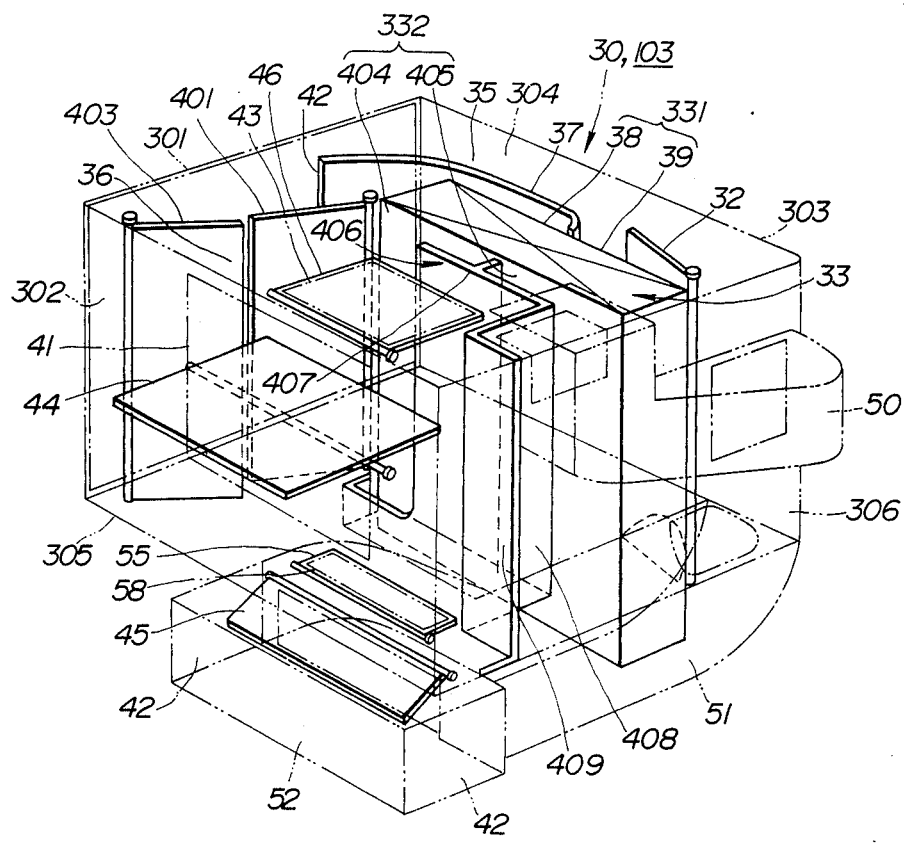
FIG. 5 is a perspective view of an internal structure of the air conditioning apparatus in a third preferred embodiment.

As shown in FIG. 5, the heating unit 30 includes intake air opening 301 at one side wall of the unit casing 31. The heating unit 30 is substantially of a box shape defined by front and rear walls 302, 303, top and bottom walls 304, 305, and a side wall 306. The air stream passage 103 is formed, starting at the intake air opening 301 and ending at the ventilation air blow outlet 41 and defrost air blow outlet 43. The ventilation air blow outlet 41 is opened at the front wall 302 and the defrost air blow outlet 43 is opened at the top wall 304.

In the third preferred embodiment, the heater core 33 having the first side surface 331 and second side surface 332 is disposed at a substantially center portion within the heating unit 30. The heater core 33 is disposed within the unit casing 31 of the heating unit 30 so that its first side surface 331 and second side surface 332 are substantially in parallel to the air flow of the air stream passage 103. In other words, the first side surface 331 and second side surface 332 of the heater core 33 are substantially parallel to the front and rear walls 302., 303. Thus, a first branch air passage 35 is formed along the first side surface 331 and rear wall 303 and a second branch air passage 36 is formed along the second side surface 332 and front wall 302 and is extended toward both ventilation and defrost air blow outlets 41 and 43. An upstream air guide member 37 is furthermore provided to halve the first branch air passage 35 and the first side surface 331. The first side surface 331 is divided at the air guide member 37 into a left air introduction surface 38 and right air introduction surface 39. The air mixing door 32 is pivotally supported on an end edge of the heater core 33 located in the vicinity of the side wall 306. The air mixing door 32 serves to limit airflow quantity introduced to the right air introduction surface 39.

On the other hand, a main door 401 is pivotally supported on or in the vicinity of the upstream end surface of the heater core 33. When the main door 401 is pivoted to an open position as denoted by a solid line of FIG. 6, a flap portion of the main door 401 is contacted with an upstream end edge 42 of the air guide member 37. When the main door 401 is, in turn, pivoted to a closed position as denoted by a dotted line of FIG. 6, the main door 401 partially closes the second branch air passage 36. A subsidiary door 403 is pivotally supported on a part of the bottom wall 305 of the heating unit casing 31. When the subsidiary door 43 is pivoted to a closed position, it is placed along the bottom wall 305. When the subsidiary door 403 is, in turn, pivoted to an open position as denoted by a dotted line of FIG. 6, the other part of the second branch air passage 36 is opened even when the main door 401 is pivoted to the closed position. Furthermore, a downstream air guide member 406 is extended from the second side surface 332 to divide the second side surface 332 into a left air output area 404 and a right air output area 405. The downstream air guide member 406 is integrally formed with a horizontal guide piece 407 juxtaposed to the left air output area 405 and with a flexed guide piece 409 in a crank shape defining a mixed air stream passage 408 in front of the right output area 405.

An upper bypass 50 is additionally provided on an outer surface of the rear side wall 306. One end of the upper bypass 50 is communicated with a downstream end of the first branch air passage 305 and the other end thereof is communicated with the mixed air passage 408. It is noted that a lower bypass 51 is also additionally provided on an outer surface of the bottom wall 305. One end of the lower bypass 51 is communicated with the downstream of the first branch air passage 305. The other end of the lower bypass 51 is communicated with a cylindrical member 52 additionally provided on the outer surface of the bottom wall 305. The floor door 45 is pivotally supported on an opening associated with the cylindrical member 52 and lower bypass 51. The two floor air blow outlets 42, 42 are respectively formed on both ends of the cylindrical member 52. An opening 58 is provided through the bottom wall 305 to communicate the downstream part of the second branch air passage 36 with the downstream part of the lower bypass 51. A bypass door 55 is pivotally supported on the opening 58.

An operation of the air conditioning apparatus in the third preferred embodiment will be described below with reference to FIGS. 6 to 9 for each operation mode of the air conditioning apparatus.

FIGS. 6 to 9 show respective air blowing operation modes in the air conditioning apparatus according to the third preferred embodiment.

Figure 6:
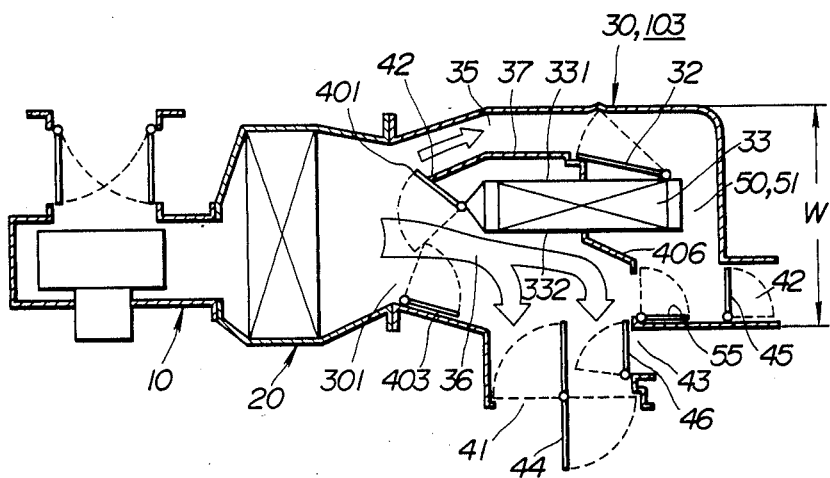
FIGS. 6 through 9 are cross sectional explanatory views of an essential part of the air conditioning apparatus for explaining air stream states in various operation modes of the air conditioning apparatus shown in FIG. 5.

(1) VENT MODE (Ventilation operation mode) (Refer to FIG. 6)

In the ventilation operation mode under the maximum cooling condition, the above-described main door 401 and subsidiary door 403 are placed at their open positions as denoted by the solid lines of FIG. 6 and the air mixing door 32 is pivoted to the close position as denoted by a solid line of FIG. 6. The ventilation air blow outlet 41 is only opened to receive the air stream of the second branch air passage 36. In addition, the bypass door 55 is driven to the open position. Hence, the cooled air stream passed through the cooling unit 20 is branched into the first and second branch air passages 35, 36 and then blown out in the vehicle compartment via the ventilation air blow outlet 41 without passing through the heater core 33. Since the heater core 33 is disposed laterally with respect to the heating unit casing top wall 303, the cross sectional areas of the first and second branch air passages 35, 36 are sufficiently secured without narrowing a dimension W shown in FIG. 6. Hence, a large quantity of cooled air required in the maximum cooling state cannot only be obtained but also the dimension W between the top and bottom walls 303, 305 can be reduced in a case when the same quantity of cooled air is desired as that in the previously proposed air conditioning apparatus disclosed in the Japanese Patent Application First Publication (Tokkai) sho No.

60-244612. It is noted that the blow-out air temperature adjustment at the time of the ventilation mode can be carried out by controlling the rate of introduced air supplied to the left and right air introduction areas 38 and 39 with the main door 401 pivoted in the close direction and air mixing door 32 pivoted through a predetermined angle in the close direction. It is noted that although in the operation described above the bypass door 55 is driven to the open direction in the ventilation operation mode, the bypass door 55 may be driven to the close direction. In this case, the cooled air is passed only through the second branch air passage 36 and blown out via the ventilation air blow outlet 41. In this case, the resistance of the heater core 33 against the air stream is small.

Figure 7:
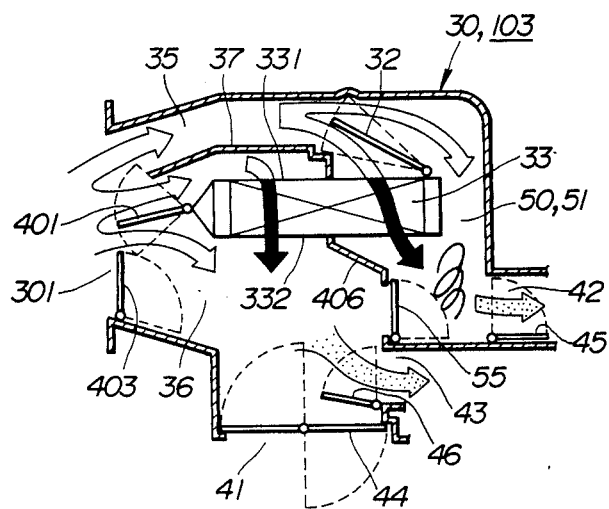

(2) DEF/FLOOR MODE (Defrost or Floor air conditioning mode) (Refer to FIG. 7)

In a defrost or floor mode of operation, the main door 401 and air mixing door 32 are placed at a half open position and the subsidiary door 403 is placed at the fully closed position. At the same time, the defrost air blow outlet 43 and floor air blow outlet 42 are opened. A part of the cooled air passed through the cooling unit 20 is then passed through the heater core 33 according to opening angles of the main door 401 and air mixing door 32. At this time, since the subsidiary door 403 is placed at the close position, a part of air bypassed through the heater core 33 generates turbulence when passing through the subsidiary door 403, thus the air mixing effect being, in this case, increased with part of air derived through the left air output area 404. On the other hand, the heated air derived through the right air output area 405 is mixed with the cooled air bypassed through the upper bypass 50 after they are passed through the heater core 33 and upper bypass 50. Furthermore, the heated air passed through the heater core 33 is mixed with the cooled air passed through the lower bypass 51 at a lower end of the mixed air passage 408.

In this way, the cooled air and heated air are sufficiently mixed with a high degree of mixture without generation of a laminar flow. It is noted that since the bypass door 55 is in the closed position in the DEF/-FLOOR mode of operation, the opening angles of the main door 401 and air mixing door 32 are separately adjusted so that blow-out air temperatures of the defrost air blow outlet 43 and floor air blow outlet 42 can separately be controlled.

Figure 8:
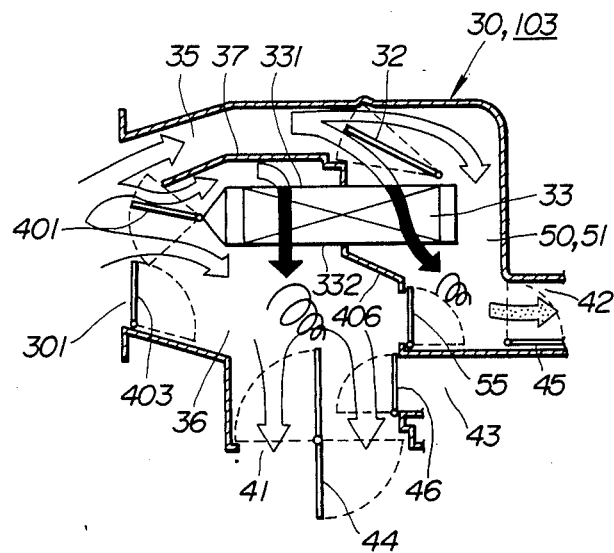

(3) B/L (Bilevel) MODE (Refer to FIG. 8)

In the B/L mode of operation, the positions of the main door 401, subsidiary door 403, air mixing door 32, and bypass door 55 are the same as those in the DEF/-FLOOR mode of operation described above. In addition, the ventilation air blow outlet 41 and floor air blow outlet 42 are opened. Hence, the same air mixing effect as that in the DEF/FLOOR operation mode can be exhibited. The blow-out air temperatures of both ventilation and floor air blow outlets 41, 42 can separately be controlled.

Figure 9:
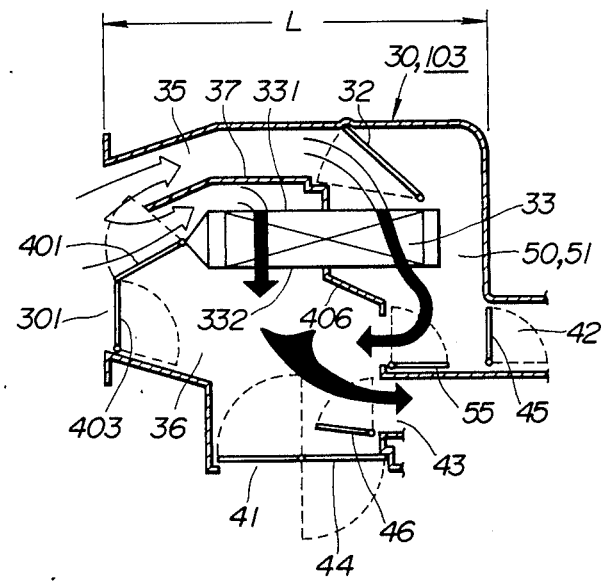

(4) DEF MODE (Defrost mode) (Refer to FIG. 9)

In a defrost mode of operation, both main door 401 and subsidiary door 403 are placed at the closed positions, the air mixing door 32 and bypass door 55 are placed at the open positions, and only the defrost air blow outlet 43 is opened. Hence, the whole air in the heating unit 30 is passed and heated through the heater core 33 and is blown out only via the defrost air blow outlet 43. At this time, since the strip-shaped main door 401 and subsidiary door 403 are cooperated to close the second branch air passage 36, the second branch air passage 36 cannot receive the cooled air from the cooling unit 20 even though the passage 36 has a sufficiently large cross sectional area. Hence, the pivoting ranges of both main door 401 and subsidiary door 403 can become narrower and the dimension L between the left and right walls 302, 306 can become smaller according to the narrowed pivotal ranges of the doors 401, 403. Consequently, since both the dimension W and dimension L can set smaller, the whole dimensions of the heating unit casing 31 can be reduced without elimination of each effect of the operation modes.

As described above, since the heater core 33 is, in the third preferred embodiment, disposed laterally in parallel to the air stream in the air stream passage of the heating unit 30, sufficient cross sectional areas of the first branch air passage (formed along the first side surface 331 of the heater core 33) and the second branch air passage (formed along the second side surface 332 and directed toward the air blow outlets 40) can be secured. Hence, in the maximum cooling condition in which the whole air is bypassed the heater core 33 (not passed into the heater core 33), a large quantity of cooled air can be derived via the first and second branch air passages having sufficient cross sectional areas. When the air conditioning apparatus in the third preferred embodiment is applied to the vehicle in which the same quantity of air as the previously proposed air conditioning apparatus is required, the interdimension between the front and rear walls of the heating unit casing can be reduced.

In addition, since the second branch air passage is closed by the cooperation of both main and subsidiary doors, the pivotal ranges of both doors can be narrowed with the lengths of both doors shortened. Hence, the dimension between the top and bottom walls can be shortened. Consequently, the small-sized heating unit casing can be achieved and space utility for the vehicle can be improved when the air conditioning apparatus is mounted on the vehicle.

Furthermore, the air mixing effect can be enhanced during the control of blow-out air temperature through the mixture of the cooled and heated air since part of air passed through the second branch air passage generates turbulence according to the opening angle of the subsidiary door.

According to the present invention, the air conditioning apparatus described in the first, second, and third preferred embodiment can exhibit the favorable maximum cooling characteristic with the reduced air resistance of the heater core against air stream in the heating unit. In addition, during this state an unfavorable turbulence such as to disturb the air flow in the heating unit can be eliminated. Furthermore, the dimensions of the air conditioning apparatus become so compacted as to enable mounting the apparatus on a limited space of a vehicle compartment. The air conditioning apparatus according to the present invention has other various advantages.

It will clearly be appreciated by those skilled in the art that the foregoing description has been made in terms of the preferred embodiments and various changes and modifications may be made without departing from the present invention which is to be defined by the appended claims.

What is claimed is:

1. A structure of an air conditioning apparatus comprising:
   (a) a casing having at least one air inlet at one end thereof and at least one air outlet at the other end thereof, air outside the casing being introduced into an internal space of the casing via the at least one air inlet and formed into an air stream within the internal space and the air stream formed within the casing being supplied into a limited space via the at least one air outlet;
   (b) a blower unit installed at the one end of the casing adjacent to the at least one air inlet for blowing the introduced air toward the other end of the casing to form the air stream;
   (c) first means disposed downstream of the blower unit for cooling the air stream;
   (d) a heater unit disposed downstream of the first means for heating the air stream passed through the first means to supply a heated air stream to the limited space via the at least one air outlet, the heater unit having an elongated rectangular shape in section including a pair of opposed first and second walls and a pair of opposed elongated third and fourth walls, the elongated third and fourth walls of heater unit being disposed substantially parallel to the air stream exiting from the first means so as to minimize air resistance against the air stream with a bypass air stream passage being defined by the second wall and a first wall of the casing;
   (e) a first air mixing door member having a pivotal end located at a portion of the internal space adjacent to and upstream of the first wall of the heater unit for adjusting an amount of the air stream to be passed through the heater unit; and
   (f) a first partitioning member disposed between a position at which the first air mixing door member is placed in a maximum cooling mode within the internal space and a substantial half portion of the third wall of said heater unit so that a first air stream passage is formed so as to face toward an upstream first half portion of the third wall and a second air stream passage is formed so as to face toward a downstream second half portion of the third wall, the bypass air passage placed between the second heater unit wall and the first wall of the casing also being formed.

2. A structure as recited in claim 1, which further comprises a second air mixing door member having a pivotal end located on a second wall of the casing between the first means and the first wall of the heater unit so as to face the air stream and which is pivotable so as to adjust the amount of the air stream to be passed through the heater unit together with the first air mixing door member, the second air mixing door member being pivoted so as to be laid on the second wall of the casing to pass the air stream toward the at least one air outlet and the first air mixing door member being pivoted to the maximum cooling position so that the air stream does not pass through the upstream first half portion of the third wall but passes partially through the second air stream passage and the bypass passage between the second heater unit wall and the first wall of the casing when the maximum cooling mode is executed.

3. A structure as recited in claim 2, which further comprises a third air mixing door member having a pivotal end located at a corner portion of the third wall of the heater unit adjacent to the second wall of the heater unit for adjusting an amount of the air stream passed through the second air stream passage toward the downstream second half portion of the third wall of the heater unit, the third air mixing door member being pivoted so as to cover the downstream second half portion of the third wall of the heater unit to pass the air stream passed through the second air stream passage toward the bypass passage between the second wall of the heater unit and the first wall of the casing when the maximum cooling mode is executed.

4. A structure as recited in claim 3, which further comprises a second partitioning member extended from a substantially half portion of the fourth wall of the heater unit opposed to the half portion of the third wall of the heater unit, the second partitioning member branching the air stream passed through the upstream first half portion of the third wall of the heater unit and passed through the downstream second half portion of the third wall of the heater unit, and a fourth door member extended between one end of the second partitioning member and a third wall of the casing for adjusting an amount of the air stream passed through a downstream half portion of the fourth wall of the heater unit opposed to the downstream second half portion of the third wall of the heater unit toward the air stream passed through the upstream first half portion of the third wall of the heater unit and an upstream first half portion of the fourth wall of the heater unit.

5. A structure as recited in claim 4, wherein the casing has a first air outlet located between the second air mixing door member and the fourth door member and a second air outlet located below the first wall of the casing and downstream of the fourth door member, the second air outlet having a fifth door member for opening and closing the second air outlet and the first air outlet having a third air outlet including a sixth door member for opening and closing the third air outlet and a fourth air outlet located between the third air outlet and a fourth wall of the casing, said fourth air outlet having a seventh door member for opening and closing the fourth air outlet.

6. A structure of an air conditioning apparatus for a vehicle compartment comprising:
   (a) a first unit having means for introducing air from the vehicle compartment and air external to the vehicle compartment and generating an air stream of the introduced air in a first direction;
   (b) a second unit having means for cooling the air stream generated by the first unit;
   (c) a third unit having means for heating the air stream cooled by the second unit according to an operation mode of the air conditioning apparatus and outputting the heated air to the vehicle compartment; the third unit having a unit casing, a heater core having an elongated direction disposed within the unit casing and inclined through a predetermined angle with respect to said first direction of the air stream so as to reduce an air resistance thereof against the air stream, and an air mixing door member disposed upstream of the heater core for operatively adjusting an airflow quantity of the air stream supplied to the heater core; the air mixing door member being substantially aligned with the elongated direction of the heater core in a maximum cooling mode of operation of the air conditioning apparatus;

(d) said heater core having a rectangular shape in cross section, a first side surface through which an air stream branched from an air stream passage through the air mixing door member is introduced into the heater core, a second side surface opposing the first side surface through which the heated air is outputted, and upstream and downstream end surfaces;

(e) a pivotal axle of the air mixing door member being attached on a corner of said heater core between the upstream end surface and said second side surface;

(f) a first door member disposed on an upstream half portion of the first side surface of the heater core operative for adjusting air flow quantity of the air stream branched from the air stream passage supplied to the upstream half portion of the first side surface of the heater core;

(g) a second door member disposed on a remaining downstream half portion of the first side surface of the heater core operative for adjusting air flow quantity of the air stream branched from the air stream passage supplied to the downstream half portion of the first side surface of the heater core; and (h) a third door member disposed adjacent a first half portion of the second side surface of the heater core operative for blocking and unblocking air flow from a remaining second half portion of the second side surface and from a space provided between the downstream end surface of the heater core and a rear wall of the unit casing to a ventilation air blow outlet linked to the vehicle compartment.

7. A structure as recited in claim 6, wherein a defrost air blow outlet linked to an upper portion of the vehicle compartment is disposed downstream of the remaining second half portion of the second side surface of the heater core.

8. A structure for an air conditioning apparatus for a vehicle compartment, comprising:

(a) a first unit having means for introducing air from the vehicle compartment and external to the vehicle compartment and generating an air stream of the introduced air;

(b) a blower unit adjacent the first unit for blowing the introduced air to form the air stream;

(c) a second unit having means for cooling the air stream generated by the first unit; and (d) a third unit having means for heating the cooled air stream by the second unit according to an operation mode of the air conditioning apparatus and outputting the heated air to the vehicle compartment, the third unit having a unit casing, a heater core in a elongated rectangular shape of cross section disposed within the unit casing and being aligned in the elongated direction substantially parallel to the air stream derived from the second unit, main and subsidiary door members disposed upstream of an upstream end surface of the heater core, the main door member operative in one position for blocking a first auxiliary passage introducing part of the air stream into a first area of a first side surface of the heater core through which air stream of the first auxiliary passage is introduced into the heater core and in another position for blocking a main passage of the air stream derived from the second unit by coacting together with the subsidiary door, and an air mixing door member disposed on a remaining second area of the first side surface of the heater core operative for blocking and unblocking the air stream of a second auxiliary passage of the main passage introducing the air stream to the second area of the first side surface of the heater core, the second auxiliary passage being linked to a floor air blow outlet via a downstream half portion of the heater core and a space between a downstream end surface of the heater core and a rear wall of the unit casing.

9. A structure as recited in claim 8, wherein the main door member is substantially parallel to the main passage when blocking the first auxiliary passage.

10. A structure as recited in claim 8, which further comprises a ventilation air blow outlet disposed so as to face against an upstream area of a second side surface of the heater core through which the air of the first auxiliary passage passed through the first area of the first side surface is outputted.

11. A structure as recited in claim 10, which further comprises a second subsidiary door member disposed between a downstream area of the second side surface of the heater core and its opposing wall of the unit casing for operatively blocking the air passage derived from the downstream area of the second side surface and from a space of the heater core against the rear wall of the unit casing.

* * * * *